United States Patent
Koch

(10) Patent No.: US 8,385,036 B2
(45) Date of Patent: Feb. 26, 2013

(54) SYSTEM AND METHOD FOR NEGATIVE VOLTAGE PROTECTION

(75) Inventor: Donald Giles Koch, Satellite Beach, FL (US)

(73) Assignee: Intersil Americas Inc., Milpitas, CA (US)

(*) Notice: Subject to any disclaimer, the term of this patent is extended or adjusted under 35 U.S.C. 154(b) by 377 days.

(21) Appl. No.: 12/761,057

(22) Filed: Apr. 15, 2010

(65) Prior Publication Data

US 2011/0080206 A1   Apr. 7, 2011

Related U.S. Application Data

(60) Provisional application No. 61/249,362, filed on Oct. 7, 2009.

(51) Int. Cl.
*H02H 3/00* (2006.01)
(52) U.S. Cl. ......................................................... 361/86
(58) Field of Classification Search ................... 361/86
See application file for complete search history.

(56) References Cited

U.S. PATENT DOCUMENTS

| | | |
|---|---|---|
| 5,422,588 A | 6/1995 | Wynne |
| 5,796,274 A | 8/1998 | Willis et al. |
| 5,818,758 A | 10/1998 | Wojciechowski |
| 6,023,427 A | 2/2000 | Lakhani et al. |
| 6,266,001 B1 | 7/2001 | Fang et al. |
| 6,414,533 B1 | 7/2002 | Graves |
| 6,469,554 B1 | 10/2002 | Harpham |
| 6,813,662 B2 * | 11/2004 | Park .................. 710/74 |
| 7,106,566 B2 | 9/2006 | Liu et al. |
| 7,129,766 B2 | 10/2006 | Steinhagen |
| 7,482,853 B2 * | 1/2009 | Koch et al. ............... 327/407 |
| 7,548,029 B2 | 6/2009 | Cheng et al. |
| 2002/0075617 A1 | 6/2002 | Ponton et al. |
| 2004/0080355 A1 | 4/2004 | Chen |
| 2005/0007711 A1 | 1/2005 | Liu et al. |
| 2005/0017688 A1 | 1/2005 | Stellberger |
| 2005/0046462 A1 | 3/2005 | Steinhagen |
| 2006/0176101 A1 | 8/2006 | Mizuno et al. |
| 2007/0096776 A1 | 5/2007 | Gose et al. |
| 2007/0188952 A1 | 8/2007 | Ker et al. |
| 2009/0072790 A1 | 3/2009 | Ibrahim |
| 2010/0014201 A1 | 1/2010 | Masson et al. |

* cited by examiner

*Primary Examiner* — Stephen W Jackson
(74) *Attorney, Agent, or Firm* — Fogg & Powers LLC

(57) ABSTRACT

An electronic system is disclosed, which includes a connector unit to communicate data with a host system, an electronic circuit to store the data, and a switch to convey the data to and from the electronic circuit via the connector unit. The switch includes a negative voltage protection unit coupled to the connector unit, and a transistor switch coupled to the negative voltage protection unit, the connector unit, and the electronic circuit. The negative voltage protection unit forces the transistor switch off if a negative voltage is detected.

20 Claims, 6 Drawing Sheets

SYSTEM AND METHOD FOR NEGATIVE VOLTAGE PROTECTION

CROSS REFERENCE TO RELATED APPLICATIONS

This application hereby claims the benefit of U.S. Provisional Patent Application Ser. No. 61/249,362 entitled "NEGATIVE VOLTAGE DETECT AND CLAMP FOR CMOS SWITCHES," filed on Oct. 7, 2009. U.S. Provisional Patent Application Ser. No. 61/249,362 is incorporated herein by reference.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
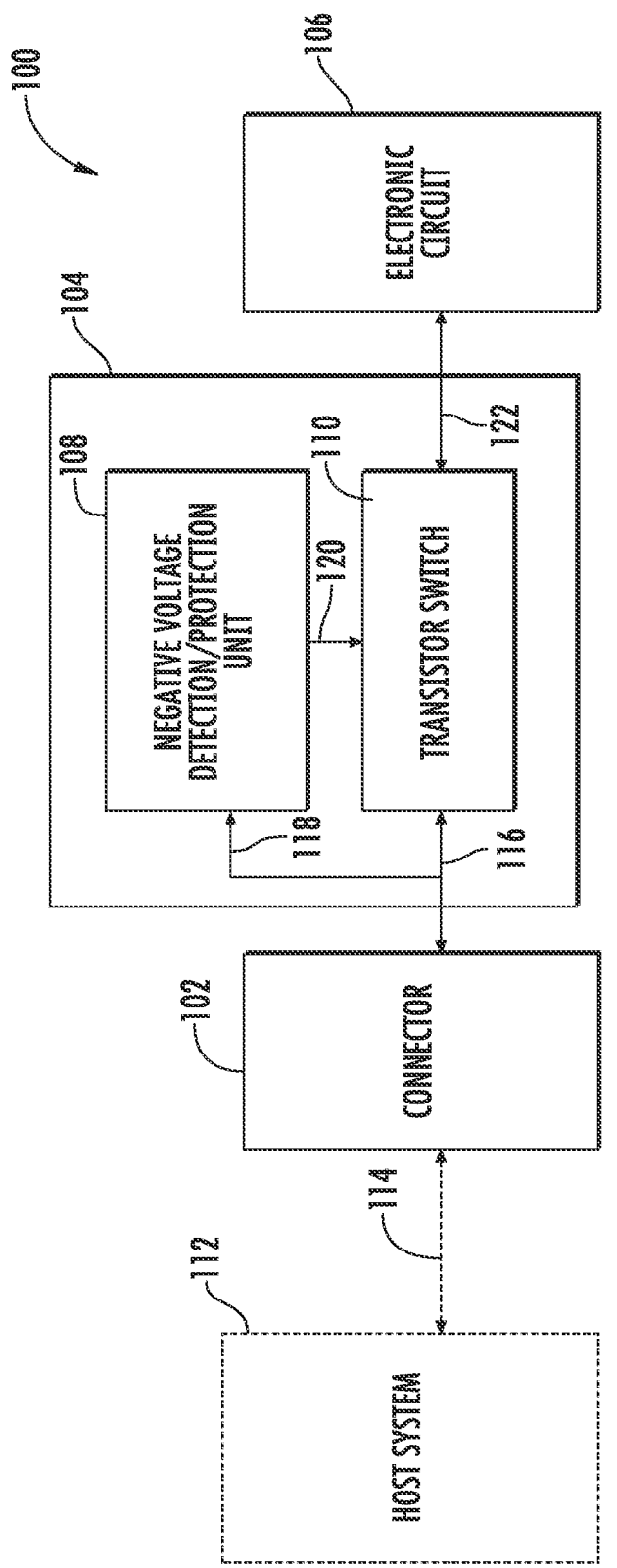
FIG. 1 is block diagram showing one embodiment of a system that utilizes a switch with negative voltage detection and protection.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which are shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual acts may be performed. The following detailed description is, therefore, not to be construed in a limiting sense.

Switches are used in a variety of applications wherein Inputs/Outputs (I/Os) to/from the switches are connected to external voltage sources through cables. Due to the high commonality and interchangeability of cable plugs, the cables can be plugged into improper voltage sources by mistake. For example, if a cable connected to an I/O terminal of a switch is plugged into a source of negative voltage, excessive current can be generated that will damage electronics connected to other terminals of the switch (e.g., on the downstream side of the switch). Embodiments of the present invention rapidly detect a negative voltage at a terminal of a switch, and turn-off the switch to protect circuitry coupled to a second terminal of the switch. As such, embodiments of the present invention enable negative voltage protection without requiring a negative charge pump or negative power supply for the switches utilized.

FIG. 1 is a block diagram showing one embodiment of a system 100 that utilizes a switch 104. In one embodiment, switch 104 is an integrated circuit (IC) switch. Referring to FIG. 1, system 100 includes a connector 102, a switch 104, and an electronic circuit 106. Switch 104 includes a negative voltage detection/protection unit 108, and a transistor switch 110. FIG. 1 also shows a host system 112 connected by a line 114 to an input/output terminal of connector 102. For example, line 114 can be a cable located externally to system 100. Also, for example, host system 112 can be a Personal Computer (PC), a general purpose computer, a network computer or server, or an audio system, video system, mixed media system, or any type of digital or analog communication system that can be adapted to communicate with an electronic circuit via a switch 104.

The input/output terminal of connector 102 is connected by line 116 to a first input/output terminal of transistor switch 110, and by line 118 to an input of negative voltage detection/protection unit 108. A second input/output terminal of transistor switch 110 is connected by line 122 to an input/output terminal of electronic circuit 106. An output of negative voltage detection/protection unit is connected by line 120 to a control terminal of transistor switch 120. As shown, connector 102 can be utilized to couple electronic circuit 106 to an external system, such as, for example, host system 112 through transistor switch 110 and cable 114.

In operation, connector 102 is plugged directly or indirectly (e.g., through cable 114) into a connector of host system 112, which includes a signal and/or voltage source. For example, if connector 102 is plugged into a connector of host system 112 including a voltage source, and the connector's or voltage source's data terminals are reversed, negative voltage detection/protection unit 108 detects a negative voltage on line 116, which is coupled to an input/output terminal transistor switch 110. In response, negative voltage detection/protection unit 108 generates and outputs a suitable signal voltage, which is conveyed on line 120 to a control input of transistor switch 110. In response to receiving the signal voltage on line 120, transistor switch 110 blocks current flow and effectively opens the contacts of transistor switch 110. Consequently, switch 104 is enabled to protect electronic circuit 106 by rapidly detecting a negative input voltage and turning off the transistor switch 110.

Figure 2:
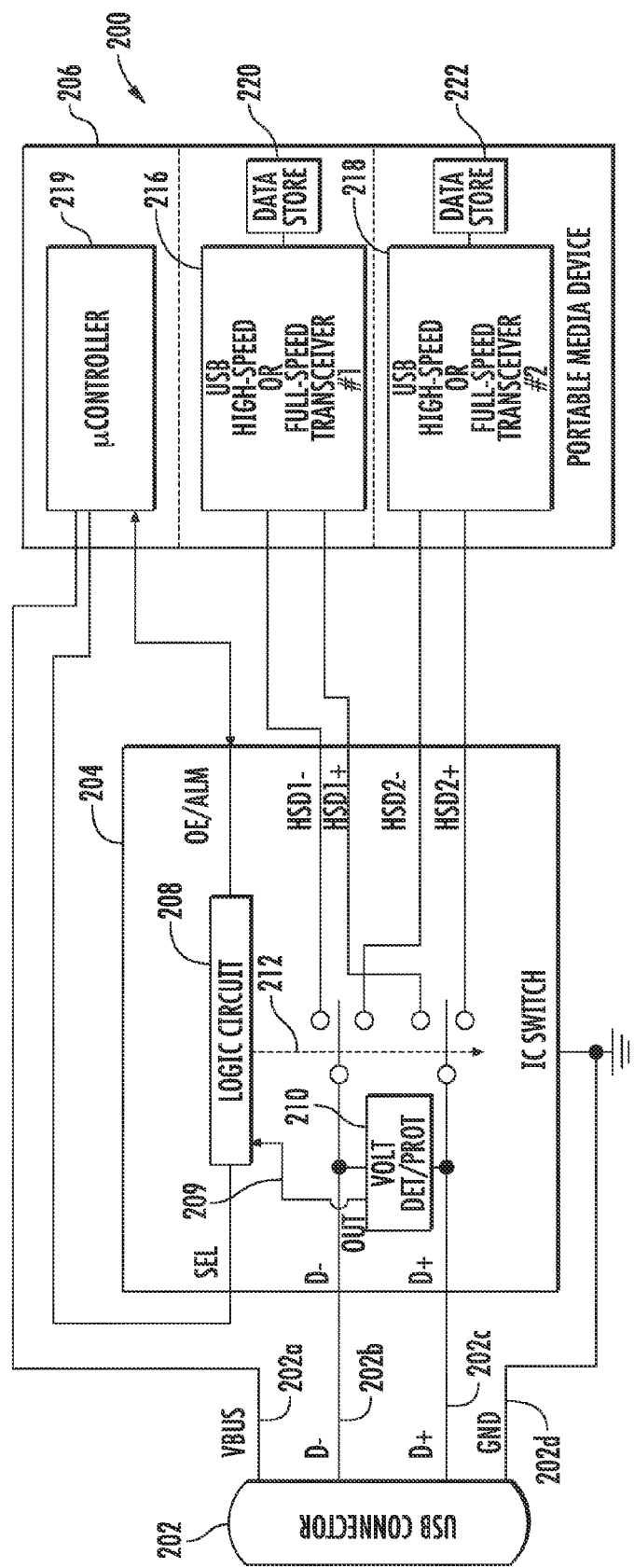
FIG. 2 is a block diagram showing one embodiment of a system that can be utilized to implement the system shown in FIG. 1.

FIG. 2 is a block diagram showing one embodiment of a system 200 that utilizes a switch 204, e.g., an integrated circuit switch. For example, system 200 can be utilized to implement system 100 shown in FIG. 1. Referring to FIG. 2, system 200 includes a connector 202, a switch 204, and a portable media device 206. In one embodiment, connector 202 can be implemented utilizing a Universal Serial Bus (USB) connector, and switch 204 can be implemented utilizing an analog Complementary Metal-Oxide Semiconductor (CMOS) switch. Switch 204 includes a logic circuit 208, a voltage detection/protection circuit 210, and a transistor switch 212. Portable media device 206 includes a microcontroller 214, a first transceiver 216, a second transceiver 218, a first data storage unit 220 connected to first transceiver 216, and a second data storage unit 222 connected to second transceiver 218. For example, portable media device 206 can be a portable device that stores and plays back digital video, digital audio, or other digital content from a personal computer (PC) or other data storage device. In some embodiments, switch 204 can be utilized in an application and/or product as a USB switch, an audio switch, a video switch, a digital data switch, or a general purpose switch. As such, connector 202 can be implemented utilizing, respectively, a USB connector, an audio connector, a video connector, a data connector, or a general purpose connector.

In one embodiment, a first terminal (VBUS) of connector 202 is connected by a line 202a to a first I/O terminal of microcontroller 214. A second terminal (D−) is connected by a line 202b to a first terminal (D−) of voltage detection/protection circuit 210 and a first contact of transistor switch 212. A third terminal (D+) is connected by a line 202c to a second terminal (D+) of voltage detection/protection circuit 210 and a second contact of transistor switch 212. A fourth terminal (GND) is connected by a line 202d to a grounded terminal of switch 204. Also, an output terminal of voltage detection/protection circuit 210 is connected by a line 209 to an input of logic circuit 208. In one embodiment, the plurality of lines 202a-202d are current conducting leads that together form an electrical cable, such as, for example, a USB cable, an audio cable, a video cable, a data cable, or a mixed-media cable. In other embodiments, each one of lines 202a-202d is a separate conductive lead (e.g., a conductive line on a printed circuit board).

In operation, connector 202 is plugged directly or indirectly (e.g., through a cable extender) into a connector including a signal and/or voltage source. For example, if connector 202 is plugged into a connector including a voltage source, and the connector's or voltage source's D+ and D− terminals are reversed, voltage detection/protection circuit 210 detects a negative voltage on line 202c and at terminal D+ of switch 204. In response, voltage detection/protection circuit 210 generates and outputs a suitable signal voltage (e.g., OUT), which is conveyed on line 209 to an input of logic circuit 208. In response to receiving the signal voltage on line 209, logic circuit 208 generates and outputs a control signal voltage to an input of transistor switch 212, which blocks current flow and effectively opens the contacts of the switch. Consequently, switch 204 is enabled to protect portable media device 106 by rapidly detecting a negative input voltage and turning off the transistor switch.

Figure 3:
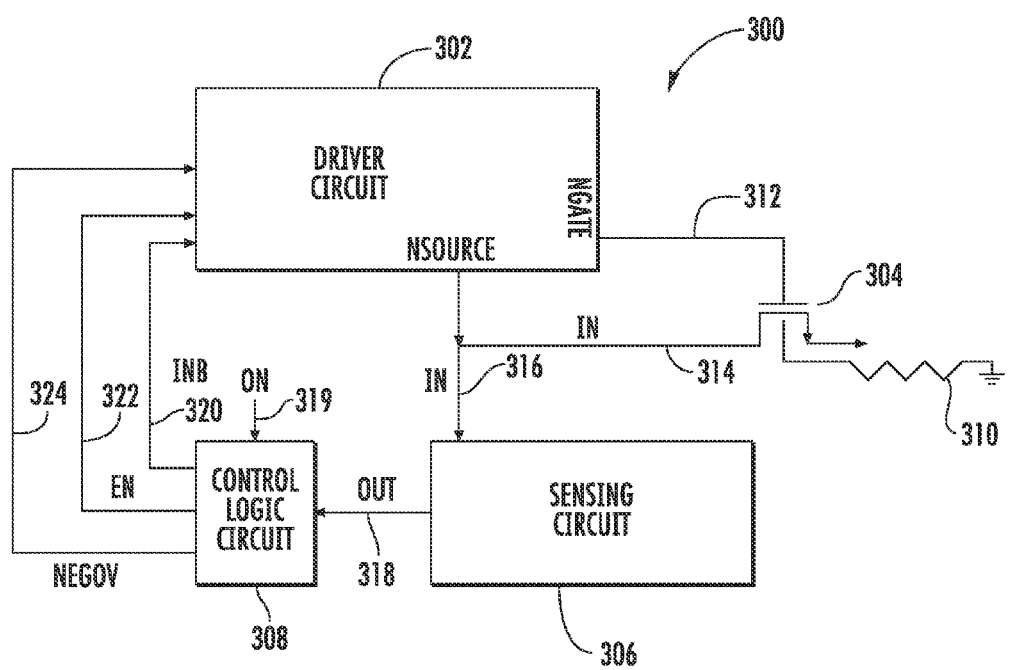
FIG. 3 is a block diagram showing one embodiment of a switch with negative voltage detection and protection.

FIG. 3 is a block diagram showing one embodiment of a switch 300. For example, switch 300 can be utilized as switch 104 shown in FIG. 1, or switch 204 shown in FIG. 2. In one embodiment, switch 300 is fabricated on a single semiconductor chip. In some embodiments, switch 300 utilizes components formed as a plurality of semiconductor devices. In one embodiment, switch 300 includes an N-channel transistor switch, such as, for example, an N-channel Field Effect Transistor (NFET) switch, which is formed utilizing a triple-well semiconductor fabrication process.

Referring to FIG. 3, switch 300 includes a driver circuit 302, a transistor switch 304, a sensing circuit 306, a control logic circuit 308, and a resistor 310. A first output of driver circuit 302 is connected by line 312 to the gate of transistor switch 304. A second output of driver circuit 302 is connected by line 314 to the effective source of transistor switch 304, and by line 316 to an input of sensing circuit 306. The source of transistor switch 304 can be coupled to circuitry downstream of the switch. (Note that in a MOSFET switch, the actual locations of the source and drain can be reversed or exchanged depending on the polarity of the voltage on these electrodes compared to the voltage on the gate. In that regard, the source can be more negative than the drain in an N-channel switch.) An output of sensing circuit 306 is connected by line 318 to a first input of control logic circuit 308. A second input of control logic circuit 308 is connected by line 319 to a terminal (ON) utilized to control the on/off state of switch 300. A first output of control logic circuit 308 is connected by line 320 to a first input of driver circuit 302, a second output is connected by line 322 to a second input of driver circuit 302, and a third output is connected by line 324 to a third input of driver circuit 302.

In one embodiment, resistor 310 is connected between the P-well body of N-channel transistor switch 304 and circuit ground, which develops a bias voltage on the P-well body of the switch. The value of resistor 310 is selected to block current flow through transistor switch 304 if the bias voltage on the P-well body of the switch is pulled down to a negative potential (e.g., below circuit ground). As such, transistor switch 304 is adapted to turn off if the voltage on its P-well body is a negative value.

In operation, if sensing circuit 306 detects a negative voltage on line 316 (e.g., at the D+ terminal of switch 204 in FIG. 2), sensing circuit 306 generates and outputs a signal voltage, OUT, which is coupled to control logic circuit 308. In response, control logic circuit 308 generates and outputs a plurality of signal voltages, INB, EN, and NEGOV, which are coupled to driver circuit 302. In response, driver circuit 302 generates and outputs a signal voltage, NGATE, which is coupled to the gate of transistor switch 304. Depending on the state of the NGATE signal voltage (described below with respect to FIG. 6), transistor switch 304 is enabled to block the passage of current flow and turn off if sensing circuit 306 detects a negative voltage on line 316.

Figure 4:
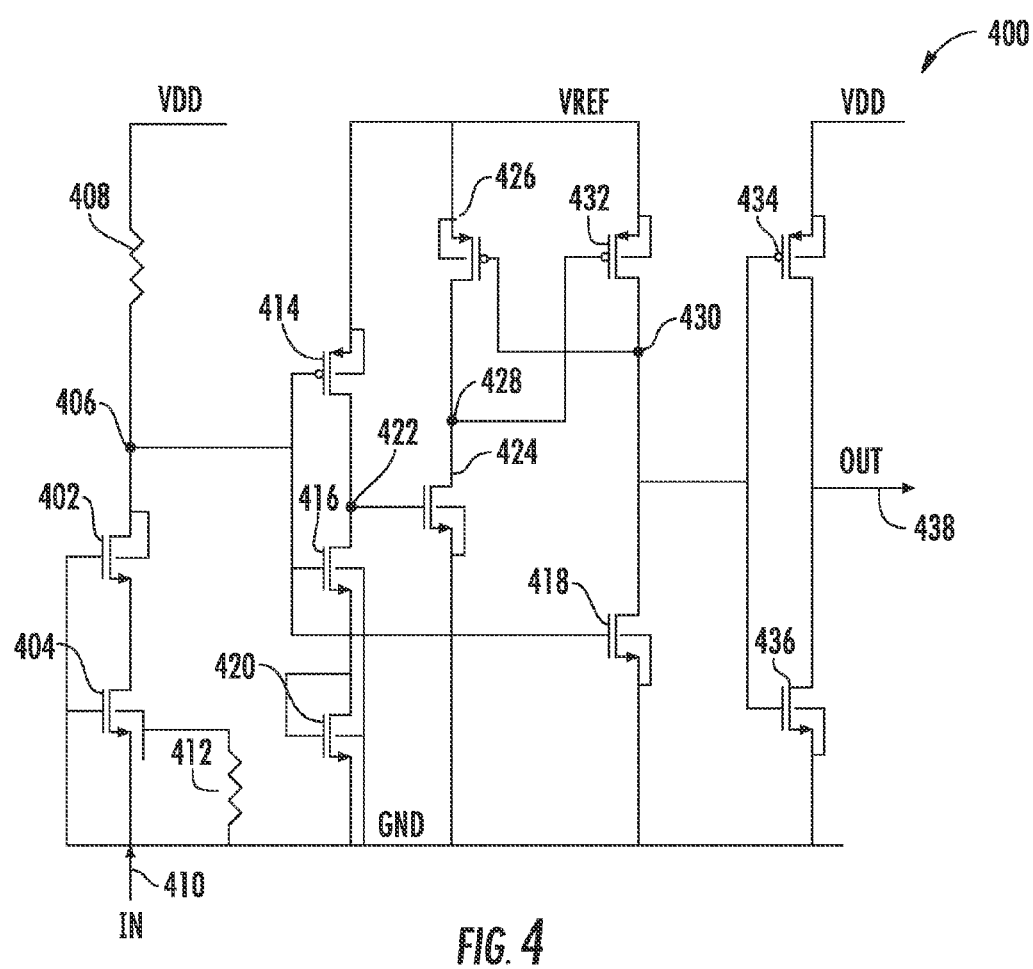
FIG. 4 is a circuit diagram showing one embodiment that can be utilized to implement the sensing circuit shown in FIG. 3.

FIG. 4 is a circuit diagram showing one embodiment of a sensing circuit 400, which can be utilized to implement sensing circuit 306 shown in FIG. 3. Also, for example, sensing circuit 400 can be utilized to implement negative voltage detection/protection unit 108 shown in FIG. 1, or voltage detection/protection unit 210 shown in FIG. 2. Referring to FIG. 4, sensing circuit 400 includes a first NFET transistor 402 and a second NFET transistor 404. In one embodiment, each transistor 402, 404 is a triple-well NFET or N-channel device. The source of transistor 402 is connected to the drain of transistor 404 to form a cascaded/cascoded configuration, and their gates are connected to circuit ground. The drain of transistor 402 is connected to a first node 406 and a terminal of a pull-up resistor 408, and the second terminal of resistor 408 is connected to a supply voltage, VDD. The source of transistor 404 is connected to a terminal 410 (IN), and the P-well body of transistor 404 is connected to a terminal of a second resistor 412. The second terminal of resistor 412 is connected to circuit ground. For example, terminal 410 (IN) shown in FIG. 4 can be a terminal connected to line 316 (IN) shown in FIG. 3.

In one embodiment, the body terminals of the cascaded/cascoded transistors 402, 404 are connected to opposing supply voltage potentials to eliminate unsuitable parasitic diode action in the P-well bodies of these transistors. The P-well body of each NFET transistor 402, 404 and its respective N+ source (or drain) form a parasitic diode, which can be forward-biased when the source (or drain) is below ground potential. Consequently, resistor 412 is utilized to limit the current flowing into the source terminal of transistor 404 if a negative voltage is detected on terminal 410.

Node 406 is connected to the respective gates of a first PFET (e.g., P-channel) transistor 414, a third NFET transistor 416, and a fourth NFET transistor 418. The source of transistor 414 is connected to a reference voltage, VREF, and its drain is connected to the drain of transistor 416 and a second node 422. The source of transistor 416 is connected to the drain of a fifth NFET transistor 420, and the source of transistor 420 is connected to circuit ground. The gate of transistor 420 is connected to its drain. Consequently, transistors 414 and 416 are configured to function as an inverter pair, and transistor 420 is configured to function as a diode. Configured as shown, transistor 420 (e.g., diode) is utilized to limit the gate-to-source voltage (VGS) of NFET transistor 416.

Node 422 is connected to the gate of a sixth NFET transistor 424. The drain of transistor 424 is connected to the drain of a second PFET transistor 426 and a third node 428. The source of transistor 426 is connected to the reference voltage, VREF, and the source of transistor 424 is connected to circuit ground. The gate of transistor 426 is connected to a fourth node 430. The drain of transistor 426 is connected to the gate of a third PFET transistor 432, and the drain of transistor 432 is connected to the gate of transistor 426. Node 428 connects the drain of transistor 426 to the gate of transistor 432, and node 430 connects the drain of transistor 432 to the gate of transistor 426. The source of transistor 432 is connected to the reference voltage, VREF, and the source of transistor 418 is connected to circuit ground. As shown, transistors 424 and 418 are configured to function as a differential pair, which utilizes the cross-coupled transistors 426, 432 as loads.

Additionally, node 430 is connected to the gate of a PFET transistor 434 and the gate of an NFET transistor 436. The source of transistor 434 is connected to the supply voltage, VDD, and the source of transistor 436 is connected to circuit ground. The drain of transistor 434 is connected to the drain of transistor 436 and an output terminal 438 (OUT). For example, terminal 438 (OUT) shown in FIG. 4 can be a terminal connected to line 318 (OUT) shown in FIG. 3.

Notably, in some embodiments, the source of each PFET transistor 414, 426, and 432 can be connected to the supply voltage, VDD. However, as shown in FIG. 4, in order to maximize the voltage-handling capabilities of sensing circuit 400, the source of each transistor 414, 426, and 432 is connected to the reference voltage, VREF, which is an internally-generated positive voltage that is lower in value than the supply voltage, VDD. Also, as stated above, in one embodiment, transistors 402, 404 are triple-well NFET or N-channel devices. However, the other NFET transistors 416, 418, 420, 424, and 436 can be implemented utilizing either standard (e.g., non-triple-well) or triple-well devices.

Under normal operating conditions, the voltage (IN) on line 410 is a positive value between zero (GND) and the supply voltage, VDD. Consequently, the cascaded/cascoded transistors 402 and 404 are turned off, and node 406 is biased at the supply voltage, VDD. In turn, the output of the inverter pair of transistors 414, 416 (node 422) is pulled low. The input and output of the inverter pair are connected to drive the differential pair of transistors 424, 418. Consequently, node 430 is pulled low to the ground potential (GND), and node 428 is pulled high to the reference voltage, VREF. The cross-coupled transistors 426, 432 are utilized to latch the voltages at nodes 406 and 422 into a stable state. Therefore, under the above-described bias conditions, the output voltage at terminal 438 (OUT) is high.

However, if the voltage IN on line 410 drops to a negative value (below ground), which in this context is an abnormal operating condition, transistors 402 and 404 begin to conduct. The resistance value of pull-up resistor 408 is relatively high, so the voltage at node 406 is pulled low. Consequently, the voltage at node 422 is pulled up to the reference voltage, VREF, which in turn, switches the state of the cross-coupled latch, transistors 426, 432. Therefore, if the voltage (IN) on line 410 is pulled to a negative potential, the output voltage at terminal 438 (OUT) is pulled low to the ground potential. Notably, it is to be understood that the switch-point of sensing circuit 400 can be adjusted by selecting a suitable resistance value for pull-up resistor 408 and suitable width and channel dimensions for the transistors shown in FIG. 4.

Figure 5:
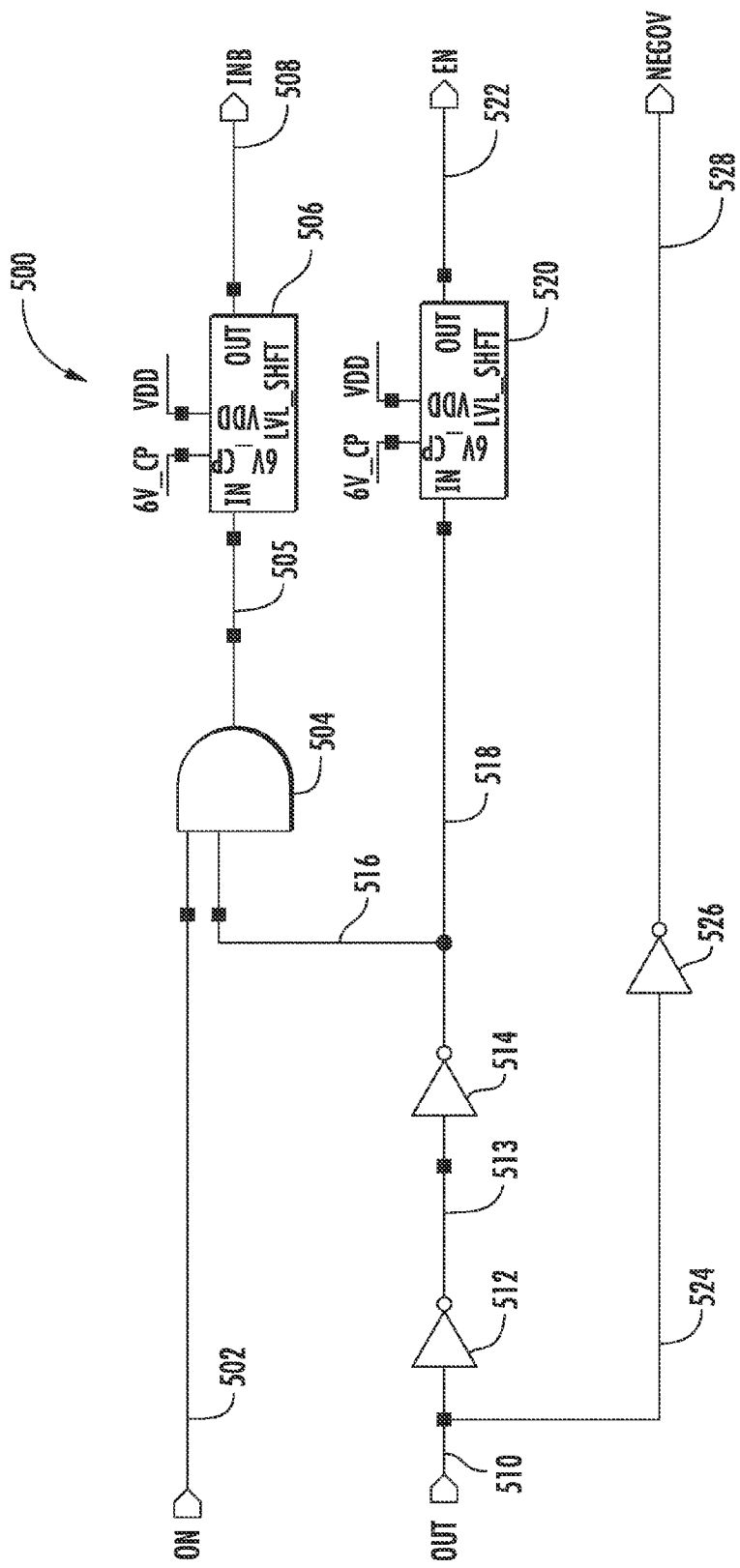
FIG. 5 is a circuit diagram showing one embodiment that can be utilized to implement the control logic circuit shown in FIG. 3.

FIG. 5 is a circuit diagram showing one embodiment of a control logic circuit 500, which can be utilized to implement control logic circuit 308 shown in FIG. 3. Also, for example, control logic circuit 500 can be utilized to implement logic circuit 208 shown in FIG. 2. Referring to FIG. 5, control logic circuit 500 includes a first input terminal (ON) connected by a line 502 to a first input of an AND gate 504. For example, the first input terminal (ON) can be connected to line 319 shown in FIG. 3. The output of AND gate 504 is connected by a line 505 to an input of a first level shifter 506. The output of level shifter 506 is connected by a line 508 to a first output terminal (INB) of control logic circuit 500.

Control logic circuit 500 also includes a second input terminal (OUT) connected by a line 510 to the input of a first inverter 512. For example, the second input terminal (OUT) can be connected to terminal 438 shown in FIG. 4, or line 318 shown in FIG. 3. The output of inverter 512 is connected by a line 513 to the input of a second inverter 514. The output of inverter 514 is connected by a line 516 to the second input of AND gate 504, and by a line 518 to an input of a second level shifter 520. The output of level shifter 520 is connected by a line 522 to a second output terminal (EN) of control logic circuit 500.

Additionally, the second input terminal (OUT) is connected by a line 524 to the input of a third inverter 526. The output of inverter 526 is connected by a line 528 to a third output terminal (NEGOV) of control logic circuit 500. Also, each level shifter 506, 520 is adapted to receive a shift control voltage (6V_CP or VDD), which can be utilized to shift the levels of the voltages received at the respective inputs, IN, of the level shifters 506, 520 to one of the voltage levels VDD or 6V_CP.

In operation, control logic circuit 500 is enabled to receive the input voltages, ON, OUT, and generate and output the voltages INB, EN, and/or NEGOV. In that regard, Table 1 (below) is an exemplary truth table that lists the possible values for the logic functions associated with control logic circuit 500:

TABLE 1

| ON | OUT | INB | EN | NEGOV |
|---|---|---|---|---|
| 0 | 0 | 0 | 0 | 1 |
| 0 | 1 | 0 | 1 | 0 |
| 1 | 0 | 0 | 0 | 1 |
| 1 | 1 | 1 | 1 | 0 |

For example, referring to Table 1, if control logic circuit 500 receives a first input voltage, ON, and a second input voltage, OUT, control logic circuit 500 outputs the voltages INB, EN. As another example, if control logic circuit 500 receives a first input voltage, ON, and no second input voltage, OUT, then control logic circuit 500 outputs the voltage NEGOV.

Figure 6:
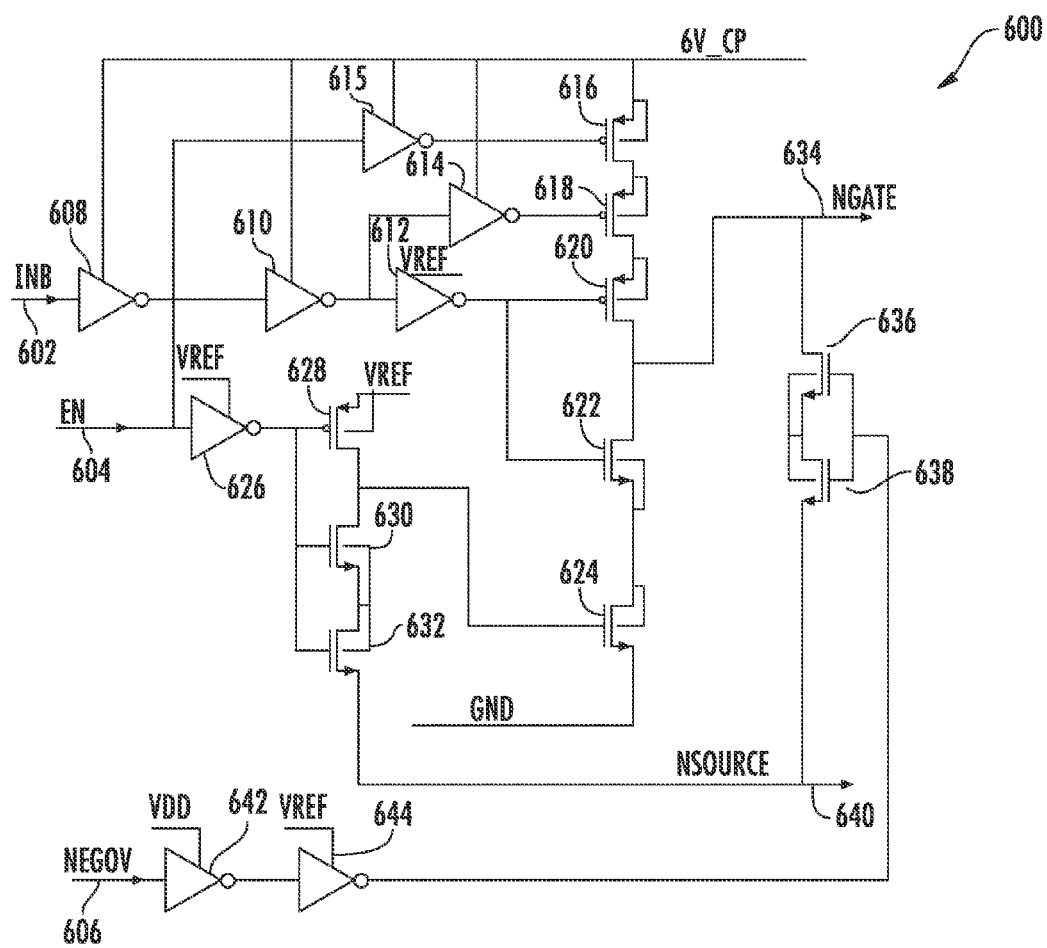
FIG. 6 is a circuit diagram showing one embodiment that can be utilized to implement the driver circuit shown in FIG. 3.

FIG. 6 is a circuit diagram showing one embodiment of a driver circuit 600, which can be utilized to implement the driver circuit 302 shown in FIG. 3. Also, for example, driver circuit 600 can be implemented in switch 204 shown in FIG. 2 (e.g., as a component part of logic circuit 208, or a component part of transistor switch 212). In FIG. 1, driver circuit 600 can be implemented in switch 104, as a component part of negative voltage detection/protection unit 108, or a component part of transistor switch 110. Referring to FIG. 6, driver circuit 600 includes a first input terminal (INB) 602, a second input terminal (EN) 604, and a third input terminal (NEGOV)

606. For example, input terminals 602, 604, and 606 can be connected, respectively, to lines 320, 322, and 324 shown in FIG. 3.

First input terminal (INB) 602 is connected to the signal input of a first inverting buffer 608, the output of first inverting buffer 608 is connected to the signal input of a second inverting buffer 610, and a second reference voltage, 6V_CP, is connected to the respective voltage supply terminals of first and second inverting buffers 608, 610. The output of second inverting buffer 610 is connected to the respective signal inputs of a third inverting buffer 612 and a fourth inverting buffer 614. The reference voltage, VREF, is connected to the voltage supply terminal of third inverting buffer 612, and the second reference voltage, 6V_CP, is connected to the voltage supply terminal of fourth inverting buffer 614. Also, second input terminal (EN) 604 is connected to the signal input of a fifth inverting buffer 615, and the second reference voltage, 6V_CP, is connected to the voltage supply terminal of fifth inverting buffer 615.

The output of fifth inverting buffer 615 is connected to the gate of a first P-channel transistor 616, the output of fourth inverting buffer 614 is connected to the gate of a second P-channel transistor 618, and the output of third inverting buffer 612 is connected to the gate of a third P-channel transistor 620. The source of first P-channel transistor 616 is connected to the second reference voltage, 6V_CP, and its drain is connected to the source of second P-channel transistor 618. Similarly, the drain of second P-channel transistor 618 is connected to the source of third P-channel transistor 620. As shown, the P-channel transistors 616, 618, 620 are connected in a cascaded configuration. The output of third inverting buffer 612 is also connected to the gate of a first N-channel transistor 622, and the drain of first N-channel transistor 622 is connected to the drain of third P-channel transistor 620 and a first output terminal (NGATE) 634 of driver circuit 600. For example, first output terminal (NGATE) 634 can be connected to line 312 shown in FIG. 3.

Additionally, second input terminal (EN) 604 is connected to the signal input of a sixth inverting buffer 626. The voltage supply terminal of sixth inverting buffer 626 is connected to the reference voltage, VREF. The output of sixth inverting buffer 626 is connected to the respective gates of a fourth P-channel transistor 628, a second N-channel transistor 630, and a third N-channel transistor 632. The source of fourth P-channel transistor 628 is connected to the reference voltage, VREF, and its drain is connected to the drain of second N-channel transistor 630 and the gate of a fourth N-channel transistor 624. The source of second N-channel transistor 630 is connected to the drain of third N-channel transistor 632, and the source of third N-channel transistor 632 is connected to a second output terminal (NSOURCE) 640 of driver circuit 600. For example, second output terminal (NSOURCE) 640 can be connected to lines 314, 316 shown in FIG. 3. Also, the source of first N-channel transistor 622 is connected to the drain of fourth N-channel transistor 624, and the source of fourth N-channel transistor 624 is connected to circuit ground.

Third input terminal (NEGOV) 606 is connected to the signal input of a seventh inverting buffer 642. The voltage supply terminal of seventh inverting buffer 642 is connected to the supply voltage, VDD, and its output is connected to the signal input of an eighth inverting buffer 644. The voltage supply terminal of eighth inverting buffer 644 is connected to the reference voltage, VREF, and its output is connected to the respective gates of a fifth N-channel transistor 636 and a sixth N-channel transistor 638. The drain of fifth N-channel transistor 636 is connected to first output terminal (NGATE) 634, and its source is connected to the drain of sixth N-channel transistor 638. The source of sixth N-channel transistor 638 is connected to the second output terminal (NSOURCE) 640. As shown, the fifth and sixth N-channel transistors 636, 638 are utilized as voltage clamps.

In one embodiment, the P-channel transistors shown in FIG. 6 are preferably PFET devices, and the N-channel transistors are preferably NFET devices. The three pairs of NFET devices (630, 632), (622, 624), (636, 638) are arranged, respectively, in cascaded configurations. Also, the P-well bodies of the three pairs of cascaded NFET devices are connected in opposing directions to avoid the development of any parasitic P-well/N+ source diode action within each cascaded pair. Furthermore, in one embodiment, triple-well NFET devices can be utilized to implement the three pairs of NFET devices shown in FIG. 6.

Additionally, in one embodiment, a CMOS inverter is utilized to implement each one of the eight inverting buffers shown in FIG. 6. For example, each inverter can be implemented utilizing a single PFET device with its source connected to the most positive rail, in series with a single NFET device having its source connected to circuit ground. In any event, the positive rail for the inverting buffers is selected to carry a voltage between that of the reference voltage, VREF (e.g., nominally +2.2V), the supply voltage, VDD (e.g., nominally +3.3V), or a second supply voltage, 6V_VDD (e.g., nominally +6V). The utilization of positive supply voltages and cascading arrangements of NFET and PFET transistors minimizes the drain-to-source voltage (VDS) and gate-to-source voltage (VGS) across each transistor, and thus complies with the maximum voltage capabilities of the fabrication process used.

In operation, referring to FIGS. 5 and 6, a signal voltage on first output terminal (NGATE) 634 can be one of three states, namely "on," "off," or "clamped." For example, if the transistor switch involved (e.g., transistor switch 304 shown in FIG. 3) is turned on ("on" state), the signals at the first and second input terminals (INB) 602 and (EN) 604 are both high, and the signal at the third input terminal (NEGOV) 606 is low. Consequently, the P-channel transistors 616, 618, 620, and 628 are turned on, and the N-channel transistors 622, 636, and 638 are turned off During this "on" state, the clamp transistors 636, 638 are turned off. Therefore, the output signal, NGATE, is biased at 6V_CP (clamp voltage). Since N-channel transistor 622 is turned off, its relatively low leakage does not significantly affect the level of the clamp voltage, 6V_CP. Consequently, the clamp voltage, 6V_CP effectively provides a positive charge-pumped voltage within driver circuit 600, which in turn provides a suitable on-resistance through the transistor switch.

If the transistor switch involved is turned off (e.g., "off" state), the signal voltages on the first input terminal (INB) 602 and the third input terminal (NEGOV) 606 are low, and the signal voltage on the second input terminal (EN) 604 is high. Consequently, the P-channel transistors 618, 620 are turned off, and the N-channel transistors 622, 624 are turned on. During this "off" state, the clamp transistors 636, 638 are turned off. Consequently, the gate terminal of the transistor switch involved is connected to circuit ground, and the transistor switch thus blocks any positive signal voltage from passing therethrough.

The third state ("clamp") is utilized to block the passage of any negative signal voltage through the transistor switch involved. During the "clamp" state, the signal voltages on the first input terminal (INB) 602 and second input terminal (EN) 604 are low, and the signal voltage on the third input terminal (NEGOV) 606 is high. For example, the signal voltage on the third input terminal (NEGOV) 606 goes high only when the signal voltage on the first input terminal (IN) 602 goes below the ground potential. Under these bias conditions, the P-channel transistors 618, 620 are turned off, and the N-channel transistors 630, 632 are turned on. Consequently, the gate of N-channel transistor 624 is clamped to a negative voltage and turned off. Also, the N-channel transistors 636, 638 are turned on, and the gate of the transistor switch involved (e.g., transistor switch 304 shown in FIG. 3) is clamped to the negative signal voltage IN (e.g., on line 314 shown in FIG. 3). By clamping the gate of the transistor switch (e.g., switch 304) to the negative signal voltage received on its source terminal, the transistor switch is turned off (thereby preventing leakage and blocking any negative signal voltage from passing therethrough).

Although specific embodiments have been illustrated and described herein, it will be appreciated by those of ordinary skill in the art that any arrangement that is calculated to achieve the same purpose, may be substituted for the specific embodiments shown. Therefore, it is intended that the present invention be limited only by the claims and the equivalents thereof.

What is claimed is:

1. An electronic system, comprising:
   a connector unit to communicate data with a host system;
   an electronic circuit to store the data; and
   a switch to convey the data to and from the electronic circuit via the connector unit, the switch comprising:
   a negative voltage protection unit coupled to at least one data terminal of the connector unit; and
   a transistor switch coupled to the negative voltage protection unit, the connector unit and the electronic circuit, wherein the negative voltage protection unit forces the transistor switch off if a negative voltage is detected at the at least one data terminal of the connector unit.

2. The system of claim 1, wherein the negative voltage protection unit detects a negative voltage received in the connector unit, and generates a signal to indicate that the negative voltage is received.

3. The system of claim 1, wherein the switch further comprises a logic circuit coupled to the negative voltage protection unit and the transistor switch, and wherein the negative voltage protection unit detects a negative voltage received in the connector unit and outputs a first signal to indicate that the negative voltage is received, and in response to receiving the first signal, the logic unit generates a second signal that forces the transistor switch off and protects the electronic circuit from receiving the negative voltage.

4. The system of claim 1, wherein the switch further comprises:
   a logic circuit coupled to the negative voltage protection unit; and
   a driver unit coupled to the logic circuit and the transistor switch, and wherein the negative voltage protection unit detects a negative voltage received in the connector unit and outputs a first signal to indicate that the negative voltage is received, and in response to receiving the first signal, the logic unit generates a second signal to turn off the transistor switch, and in response to receiving the second signal, the driver unit generates a third signal that turns off the transistor switch.

5. The system of claim 1, wherein the transistor switch is an N-channel Complementary Metal-Oxide Semiconductor (CMOS) transistor device.

6. The system of claim 1, wherein the transistor switch is a triple-well N-channel Field Effect Transistor (NFET) device.

7. The system of claim 1, wherein the transistor switch is a triple-well NFET device including a P-well body, and the P-well body in the transistor switch is coupled to a ground potential in the switch to provide a voltage bias between the P-well body and ground.

8. The system of claim 1, wherein the transistor switch is an NFET device including a P-well body, and if a negative voltage is applied to the P-well body of the transistor switch, the transistor switch is operable to block current flow and turn off.

9. The system of claim 1, wherein the connector unit is a Universal Serial Bus (USB) connector, the transistor switch is a USB switch, and the electronic circuit is a portable media device.

10. A data communication system with negative voltage protection, comprising:
    a system to communicate data;
    a circuit to receive the data;
    a connector to convey the data between the system and the circuit; and
    a switch coupled to the connector, the switch comprising:
    a transistor including an input data terminal to receive the data, a control terminal, and an output terminal coupled to the circuit;
    a sensing circuit coupled to the input data terminal;
    a logic circuit coupled to an output of the sensing circuit; and
    a driver circuit coupled to an output of the logic circuit and the control terminal of the transistor, the logic circuit causing the driver circuit to disable the transistor if the sensing circuit detects a negative voltage on the input data terminal.

11. The data communication system of claim 10, wherein:
    if the sensing circuit detects a negative voltage on the input data terminal, the sensing circuit generates a first signal indicating a detection of the negative voltage, the logic circuit receives the first signal and generates at least one logic signal, the driver circuit receives the at least one logic signal and generates a control signal, and the transistor receives the control signal and is turned off.

12. The data communication system of claim 10, wherein the transistor includes a P-well body, and if a negative voltage is coupled to the P-well body of the transistor, the transistor is operable to block current flow and turn off.

13. The data communication system of claim 10, wherein the driver circuit generates a control signal voltage clamped to a positive voltage supply.

14. The data communication system of claim 10, wherein the driver circuit generates a control signal voltage indicating one state of a plurality of operating states for the transistor switch.

15. A method for negative voltage protection, comprising:
    transmitting a voltage signal from a system;
    receiving the voltage signal in an electronic circuit;
    conveying the voltage signal between the system and the electronic circuit;
    receiving the voltage signal on an input data terminal of a transistor switch;
    determining if the voltage signal received on the input data terminal is a negative voltage; and
    if the voltage signal received on the input data terminal of the transistor switch is a negative voltage, turning off the transistor switch.

16. The method of claim 15, further comprising:
    coupling a sensing circuit to the input data terminal of the transistor switch, wherein the determining step is performed by the sensing circuit.

17. The method of claim 15, wherein receiving the voltage signal further comprises receiving the negative voltage on a P-well body of the transistor switch, and turning off the transistor switch comprises blocking current flow through the transistor switch.

18. The method of claim 15, further comprising:
if the voltage signal received on the input data terminal of the transistor switch is a negative voltage, generating a signal voltage indicating that the voltage signal received on the input data terminal is a negative voltage.

19. The method of claim 15, wherein receiving the voltage signal on an input data terminal of the transistor switch comprises receiving the voltage signal on an input terminal of a triple-well N-channel transistor.

20. The method of claim 15, wherein receiving the voltage signal on the input data terminal of the transistor switch comprises receiving the voltage signal on an input terminal of at least one of a USB switch, an audio switch, a video switch, and a media switch.

* * * * *